(12) United States Patent
Eiza et al.

(10) Patent No.: US 7,751,298 B2
(45) Date of Patent: Jul. 6, 2010

(54) OPTICAL DISC APPARATUS

(75) Inventors: Tsuyoshi Eiza, Osaka (JP); Shinya Shimizu, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 493 days.

(21) Appl. No.: 11/797,297

(22) Filed: May 2, 2007

(65) Prior Publication Data

US 2007/0263520 A1  Nov. 15, 2007

(30) Foreign Application Priority Data

May 9, 2006  (JP) .............................. 2006-129890

(51) Int. Cl.
  *G11B 7/135* (2006.01)
(52) U.S. Cl. .................... 369/112.08; 369/112.02; 359/16; 359/637; 359/322; 359/342; 359/237
(58) Field of Classification Search .............. None
  See application file for complete search history.

(56) References Cited

U.S. PATENT DOCUMENTS

| | | | | |
|---|---|---|---|---|
| 6,151,154 | A * | 11/2000 | Ogasawara et al. | 359/279 |
| 6,411,576 | B1 * | 6/2002 | Furukawa et al. | 369/53.19 |
| 6,937,381 | B2 * | 8/2005 | Kitamura et al. | 359/279 |
| 2001/0033541 | A1 | 10/2001 | Iwasaki et al. | 369/112.02 |
| 2004/0090882 | A1 | 5/2004 | Saimi et al. | 369/44.23 |
| 2005/0180294 | A1 * | 8/2005 | Kimura et al. | 369/112.05 |
| 2007/0211598 | A1 * | 9/2007 | Eiza et al. | 369/112.02 |
| 2007/0237053 | A1 * | 10/2007 | Shihara et al. | 369/112.02 |

FOREIGN PATENT DOCUMENTS

| | | |
|---|---|---|
| EP | 1 168 055 A2 | 1/2002 |
| JP | 3489193 B | 11/2003 |
| JP | 2005-221724 A | 8/2005 |

* cited by examiner

*Primary Examiner*—Joseph H Feild
*Assistant Examiner*—Ifedayo Iluyomade
(74) *Attorney, Agent, or Firm*—Morgan Lewis & Bockius LLP

(57) ABSTRACT

A liquid crystal element for correcting wave aberration included in an optical disc apparatus, is controlled by a liquid crystal element control unit which has a memory portion that stores information about a variation with time of orientation direction of liquid crystal in the case where a voltage is applied to the liquid crystal, with respect to at least one type of voltage value. The liquid crystal element control unit has a drive voltage deciding portion that obtains time period after a predetermined drive voltage is applied to the liquid crystal element until a reproduced signal obtained by processing an electric signal converted by the light detecting unit becomes optimal, and decides a drive voltage to be applied to the liquid crystal element based on the obtained time period, the information stored in the memory portion, and the predetermined drive voltage.

11 Claims, 6 Drawing Sheets

OPTICAL DISC APPARATUS

This application is based on Japanese Patent Application No. 2006-129890 filed on May 9, 2006, the contents of which are hereby incorporated by reference.

BACKGROUND OF THE INVENTION

1. Field of the Invention

The present invention relates to an optical disc apparatus that is used for recording and reproducing information on an optical recording medium. In particular, the present invention relates to an optical disc apparatus equipped with a liquid crystal element.

2. Description of Related Art

Optical recording media including a compact disc (hereinafter referred to as a CD) and a digital versatile disc (hereinafter referred to as a DVD) are widely available. In addition, researches on the high density of the optical recording medium are being carried on in recent years in order to increase recording capacity of the optical recording medium. For example, a high density optical recording medium such as a Blu-Ray Disc (hereinafter referred to as a BD) is being available in the market. Reproducing and recording information on the optical recording medium is performed by using an optical disc apparatus that is equipped with an optical pickup that projects a light beam from a light source onto the optical recording medium so that information is read or written.

An optical recording medium is provided with a transparent protective layer having a predetermined thickness that is formed so as to cover a recording surface for protecting the same. It is difficult to form this protective layer so as to have a predetermined thickness uniformly in the manufacturing process, and actually the thickness may have some error. If an error is generated in the thickness of the protective layer of the optical recording medium, spherical aberration is generated, which causes a problem of deterioration in a reproduced signal that is obtained when the optical recording medium is written and read by the optical disc apparatus.

This spherical aberration increases in proportion to biquadrate of a numerical aperture (NA) of an objective lens that condenses a light beam from a light source of the optical pickup onto the recording surface of the optical recording medium. Therefore, generation of the spherical aberration due to a variation of thickness of the protective layer will become a serious problem particularly in the optical disc apparatus that supports a BD or the like, because it generally uses the objective lens having a high numerical aperture (for example, NA=0.85).

There is conventionally known an optical disc apparatus that is equipped with a liquid crystal element having a refractive index that is variable in accordance with a drive voltage, which is disposed in an optical system of the optical pickup of the optical disc apparatus for a purpose of correcting spherical aberration. A voltage that is applied to the liquid crystal element is controlled so that a phase of a light beam that passes through the liquid crystal element for correcting the spherical aberration. It is necessary to give a condition for correcting spherical aberration (i.e., a drive voltage for driving the liquid crystal element) to the liquid crystal element every time when an optical recording medium is loaded to the optical disc apparatus, so as to correct spherical aberration that is generated by a variation of the optical recording medium (e.g., a variation of thickness of the protective layer).

As such a technique, for example, Japanese patent publication No. 3489193 discloses an optical disc apparatus that can correct spherical aberration by using an optimal correction value constantly during its reproducing operation even if spherical aberration is generated due to a thickness error or the like of a protective layer of an optical recording medium. It is noted that a tracking servo gain is decreased in accordance with a degree of the spherical aberration if the spherical aberration is generated in the optical system. Therefore, the optical disc apparatus is structured so that the correction value of spherical aberration is transferred if necessary in the direction in which the tracking servo gain increases.

However, since the optical disc apparatus disclosed in the Japanese patent publication No. 3489193 has the structure in which a drive voltage of the liquid crystal element is changed at least two times or more for obtaining the optimal spherical aberration, it takes much time to obtain an optimal value for correcting spherical aberration. Thus, there is a problem that it takes long time until reproduction with a good quality can be performed.

SUMMARY OF THE INVENTION

In view of the above described problem, it is an object of the present invention to provide an optical disc apparatus equipped with a liquid crystal element for correcting wave aberration, which is capable of correcting wave aberration appropriately despite of variation of optical recording media. In addition, another object of the present invention is to provide an optical disc apparatus that is capable of detecting an optimal drive voltage to be applied to the liquid crystal element so that wave aberration can be corrected appropriately.

To attain the above described object, an optical disc apparatus in accordance with a first aspect of the present invention includes: a light source; an optical system including an objective lens, which condenses a light beam emitted from the light source onto a recording surface of the optical recording medium and leads a light beam reflected by the recording surface to a predetermined light receiving position; a liquid crystal element including liquid crystal and two transparent electrodes that sandwich the liquid crystal, the liquid crystal element disposed in the optical system so as to correct wave aberration; and light detecting unit disposed at the predetermined light receiving position so as to receive the light beam reflected by the recording surface. Further, the optical disc apparatus is characterized by further including a memory portion for storing information about a variation with time of orientation direction of the liquid crystal in the case where a voltage is applied to the liquid crystal, with respect to at least one type of voltage value, and a drive voltage deciding portion that obtains time period after a predetermined drive voltage is applied to the liquid crystal element until a reproduced signal obtained by processing an electric signal converted by the light detecting unit becomes optimal, and decides a drive voltage to be applied to the liquid crystal element based on the obtained time period, the information stored in the memory portion, and the predetermined drive voltage.

An optical disc apparatus in accordance with a second aspect of the present invention is characterized by a structure in which the information about the variation with time of orientation direction of the liquid crystal is information about a variation with time of a phase of a light beam that passes through the liquid crystal in the above described first structure.

An optical disc apparatus in accordance with a third aspect of the present invention is characterized by a structure in which the time period until the reproduced signal becomes optimal is obtained by measuring any one of amplitude of the RF signal, amplitude of a tracking error signal and a jitter value, simultaneously with application of the predetermined drive voltage at an interval of a constant time period in the above described first or second structure.

An optical disc apparatus in accordance with a fourth aspect of the present invention is characterized by a structure in which at least one of the transparent electrodes is divided into a plurality of regions, so that the liquid crystal element is driven by applying individual voltages to the plurality of regions, the predetermined drive voltage is a predetermined voltage to be applied to each of the plurality of regions, and the drive voltage that is decided by the drive voltage deciding portion is a voltage to be applied to each of the plurality of regions in the above described first or second structure.

An optical disc apparatus in accordance with a fifth aspect of the present invention is characterized by a structure in which a temperature sensing unit for measuring ambient temperature of the liquid crystal element is disposed in the apparatus, the memory portion stores the information about the variation with time of orientation direction of the liquid crystal for each predetermined temperature with respect to at least one type of voltage value, and the drive voltage deciding portion decides the drive voltage to be applied to the liquid crystal element based on the temperature obtained by the temperature sensing unit in the above described first or second structure.

According to the first structure of the present invention, a drive voltage of the liquid crystal element for correcting wave aberration appropriately can be decided every time when an optical recording medium is loaded to the optical disc apparatus. Therefore, recording or reproducing quality of the optical disc apparatus can be improved despite of a variation or the like of the optical recording medium. In addition, when an appropriate drive voltage to be applied to the liquid crystal element is detected, a desired drive voltage can be obtained only by setting once the drive voltage to be applied to the liquid crystal element so that an appropriate drive voltage to be applied to the liquid crystal element can be obtained at high speed.

In addition, according to the second structure of the present invention, in the optical disc apparatus having the first structure described above, collection of data to be stored in the memory portion can be realized easily, so it is easy to obtain an optical disc apparatus having good recording or reproducing quality despite of a variation or the like of the optical recording medium.

In addition, according to the third structure of the present invention, in the optical disc apparatus having the first or the second structure described above, it is easy to detect the case where the reproduced signal becomes optimal. Therefore, the optical disc apparatus of the present invention can be realized easily.

In addition, according to the fourth structure of the present invention, in the optical disc apparatus having any one of the first to the third structures, wave aberration can be corrected appropriately because the transparent electrode of the liquid crystal element is divided into a plurality of regions, to which individual voltages are applied.

In addition, according to the fifth structure of the present invention, in the optical disc apparatus having any one of the first to the fourth structures, the liquid crystal element can correct wave aberration more appropriately because it can respond to a characteristic variation of the liquid crystal element due to a temperature variation. Therefore, recording or reproducing quality of the optical disc apparatus can be further improved.

DETAILED DESCRIPTION OF THE PREFERRED EMBODIMENTS

Hereinafter, embodiments of the present invention will be described in detail. However, the embodiments described here are merely examples, and the present invention should not be understood to be limited to the embodiments described here.

Figure 1:
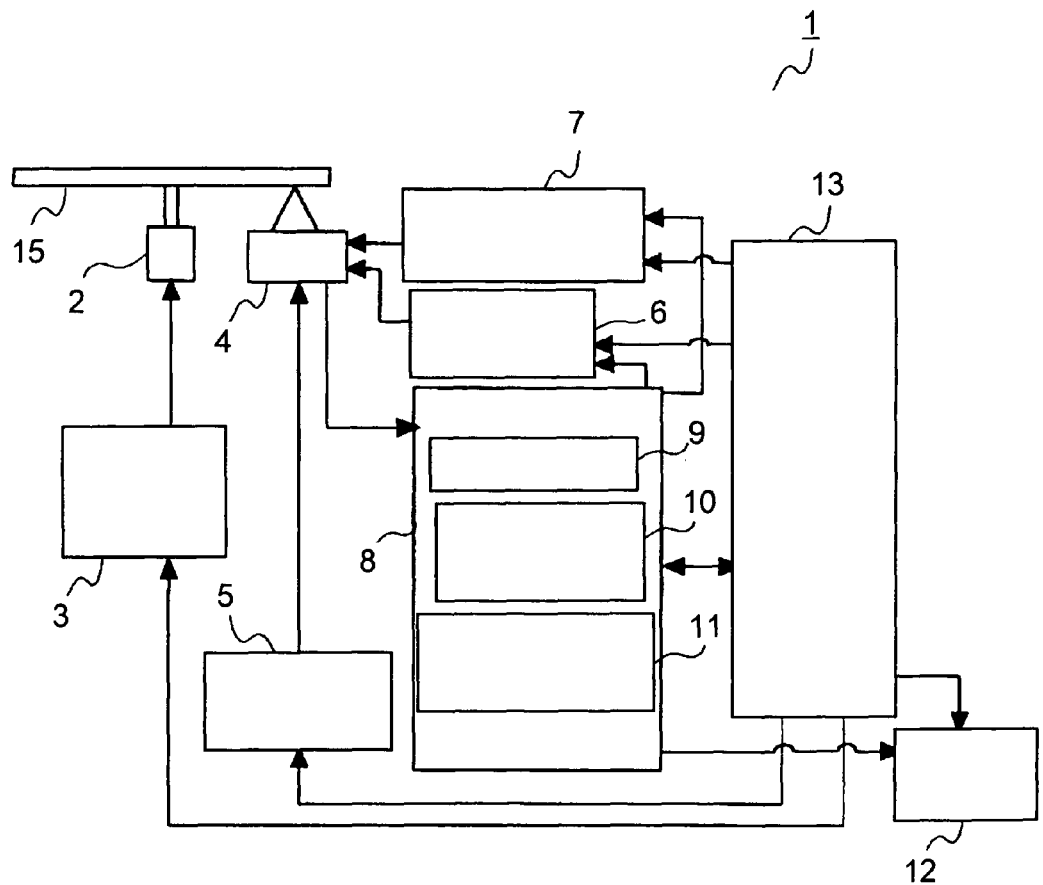
FIG. 1 is a block diagram to show a structure of an optical disc apparatus according to one embodiment of the present invention.

FIG. 1 is a block diagram to show a structure of an optical disc apparatus according to the present embodiment. The optical disc apparatus 1 is capable of reproducing information from an optical recording medium 15 and recording information on the optical recording medium 15. Numeral 2 denotes a spindle motor, and the optical recording medium 15 is retained in a detachable manner by a chucking portion (not shown) that is provided to the upper portion of the spindle motor 2. When information is reproduced or recorded on the optical recording medium 15, the spindle motor 2 rotates the optical recording medium 15 continuously. Rotation control of the spindle motor 2 is performed by the spindle motor control unit 3.

Figure 2:
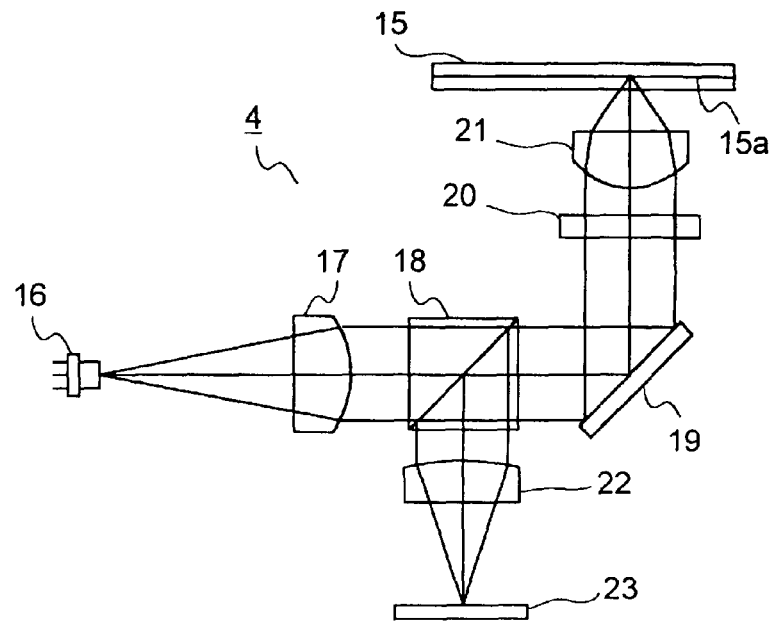
FIG. 2 is a schematic diagram of an optical system of an optical pickup that is provided to the optical disc apparatus according to the present embodiment.

Numeral 4 denotes an optical pickup, which projects a light beam emitted from a light source onto the optical recording medium 15 so that information can be written on the optical recording medium 15 and that information recorded on the optical recording medium 15 can be read. FIG. 2 is a schematic diagram to show an optical system of the optical pickup 4. As shown in FIG. 2, a light beam emitted from the light source 16 in the optical pickup 4 is made parallel rays by a collimator lens 17, passes through a beam splitter 18, and is reflected by an upstand mirror 19 so that its optical axis becomes substantially perpendicular to a recording surface 15a of the optical recording medium 15. Then, it passes through the liquid crystal element 20 and is condensed by the objective lens 21 onto the recording surface 15a of the optical recording medium 15 for recording information.

A reflection light that was reflected by the optical recording medium 15 passes through the objective lens 21 and the liquid crystal element 20 in this order and is reflected by the upstand mirror 19. Then, it is reflected by the beam splitter 18 and is condensed by the condenser lens 22 onto a light receiving portion (not shown) of a photo detector 23. The photo detector 23 converts light information of the received light beam into an electric signal.

Figure 3A:
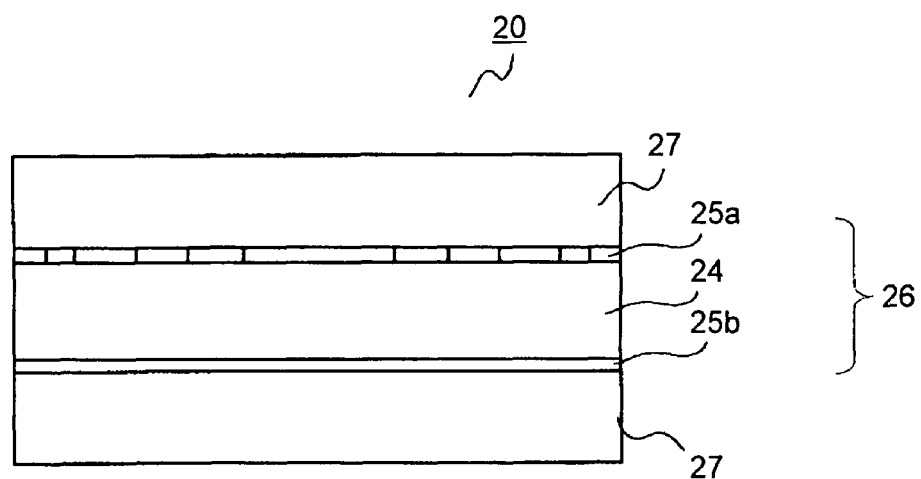
FIGS. 3A and 3B are explanatory diagrams for explaining a structure of a liquid crystal element that is provided to the optical disc apparatus according to the present embodiment.
Figure 3B:
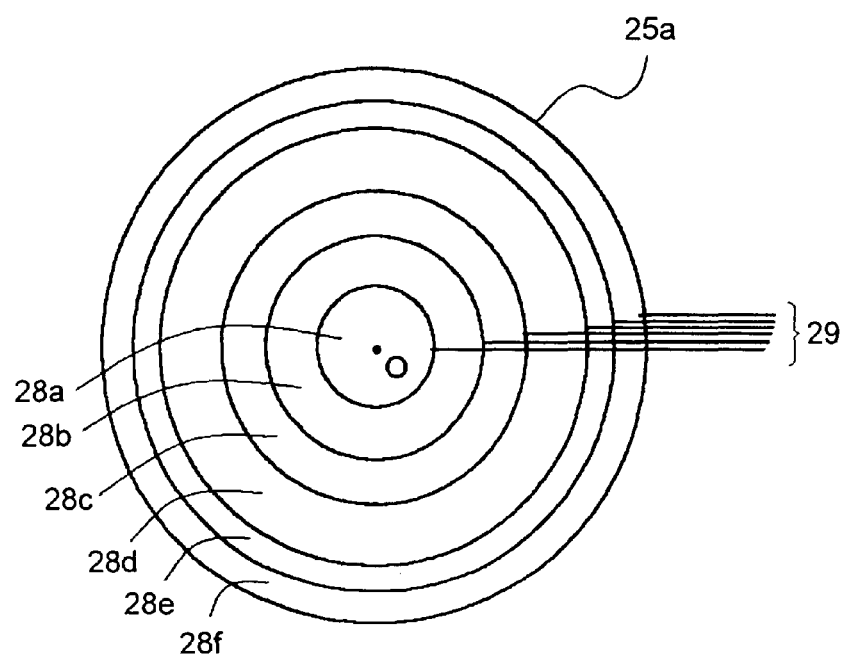

The optical pickup 4 of the present embodiment is provided with the liquid crystal element 20, and this liquid crystal element 20 is designed so as to correct spherical aberration. Hereinafter, a structure of the liquid crystal element 20 in the present embodiment will be described. FIGS. 3A and 3B are diagrams for explaining a structure of the liquid crystal element 20 that is provided to the optical pickup 4. FIG. 3A is a schematic cross section to show a structure of the liquid crystal element 20, and FIG. 3B is a plan view of the liquid crystal element 20 shown in FIG. 3A viewed from the top. It should be noted that the structure of the liquid crystal element 20 described here is merely an example, and the present invention is not limited to this example.

As shown in FIG. 3A, the liquid crystal element 20 includes liquid crystal 24, two transparent electrodes 25a and 25b that sandwich the liquid crystal 24, and two glass plates 27 that sandwich a part 26 made up of the liquid crystal 24 and the transparent electrodes 25a and 25b. In addition, as shown in FIG. 3B, the transparent electrode 25a that constitutes the liquid crystal element 20 is divided into a plurality of concentric circular regions 28a-28f. In contrast, the transparent electrode 25b that is opposed to the transparent electrode 25a is a single common electrode as a whole without divided.

At this point, the transparent electrode 25b may also be divided into a plurality of concentric circular regions in the same manner as the transparent electrode 25a. In addition, the number of regions formed by dividing the transparent electrode 25a (six in the present embodiment) is not limited to the structure of the present embodiment but can be changed appropriately, if necessary.

When drive voltages are applied to the transparent electrodes 25a and 25b of the liquid crystal element 20 having the structure described above, the liquid crystal 24 alters its orientation direction so that a change in its refractive index is generated. Thus, the light beam that passes through the liquid crystal element 20 generates a phase difference in accordance with the drive voltages that are applied to the liquid crystal element 20. Since the transparent electrode 25a of the liquid crystal element 20 is divided into a plurality of regions as described above, desired phase differences can be generated in the light beam that passes through the liquid crystal element 20 by adjusting the voltages to be applied to the regions 28a-28f so that spherical aberration can be corrected appropriately.

At this point, the transparent electrodes 25a and 25b are connected electrically via lead wires 29 to a liquid crystal element driving circuit (not shown) that is provided to the liquid crystal element control unit 6 (see FIG. 1), so that the liquid crystal element control unit 6 can control the drive voltages that are applied to the liquid crystal element 20. Details of drive control performed by the liquid crystal element control unit 6 for the liquid crystal element 20 will be described later.

With reference to FIG. 1 again, the optical disc apparatus 1 is provided with a signal processing unit 8, which includes at least an RF signal processing portion 9, a track error signal processing portion 10 and a focus error signal processing portion 11. The signal processing unit 8 produces an RF signal, a track error signal (TE signal), and a focus error signal (FE signal) based on the electric signal that is produced by the photo detector 23 (see FIG. 2). The RF signal is demodulated by a data demodulating unit 12 into data, which is delivered to external equipment such as a personal computer via an interface (not shown).

Figure 4:
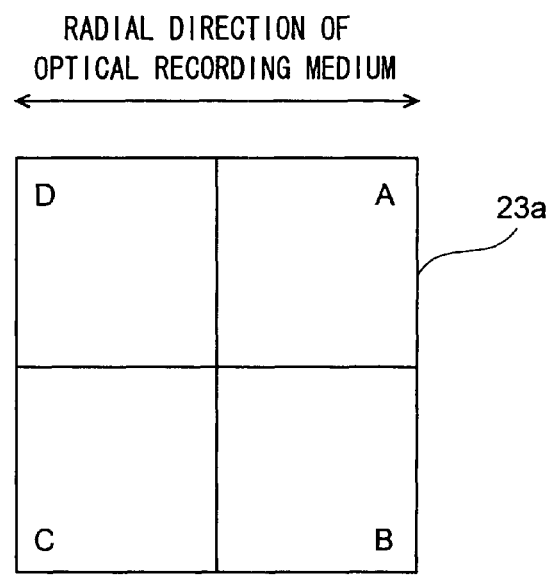
FIG. 4 is a schematic plan view to show a structure of a light receiving area of a photo detector that is provided to the optical disc apparatus according to the present embodiment.

In the present embodiment, the light receiving area 23a of the photo detector 23 (see FIG. 2) is made up of four regions A, B, C, and D as shown in FIG. 4. When electric signals obtained in the regions are represented by SA, SB, SC, and SD, respectively, the FE signal and the TE signal are obtained as the following equations.

$$FE\ signal=(SA+SC)-(SB+SD)$$

$$TE\ signal=(SA+SB)-(SC+SD)$$

More specifically, the FE signal is obtained by a so-called anastigmatic method, and the TE signal is obtained by a so-called push-pull method. At this point, the structure for obtaining the FE signal and the TE signal is not limited to this structure but can be modified variously. For example, it is possible to obtain the FE signal by a so-called spot size method and to obtain the TE signal by a so-called correct far-field method.

The TE signal and the FE signal are delivered to the actuator control unit 7. The actuator control unit 7 supplies drive signals to an actuator (not shown) for moving the objective lens 21 based on the above mentioned signals. When the drive signals are supplied to the actuator, it activates individual portions based on the signals. Thus, it performs focus control in which the objective lens 21 is moved in the direction parallel with the optical axis so that its focal point follows the recording surface 15a of the optical recording medium 15, and it also performs tracking control in which the objective lens 21 is moved in the direction parallel with the radius of the optical recording medium 15 so that a spot position of the light beam follows a track formed on the optical recording medium 15.

The laser control unit 5 controls laser power of the light source 16 (see FIG. 2) that is provided to the optical pickup 4 and is made up of a semiconductor laser. A general control unit 13 controls the spindle motor control unit 3, the laser control unit 5, the liquid crystal element control unit 6, the actuator control unit 7, the signal processing unit 8, the data demodulating unit 12, and the like for controlling the whole apparatus.

Figure 5:
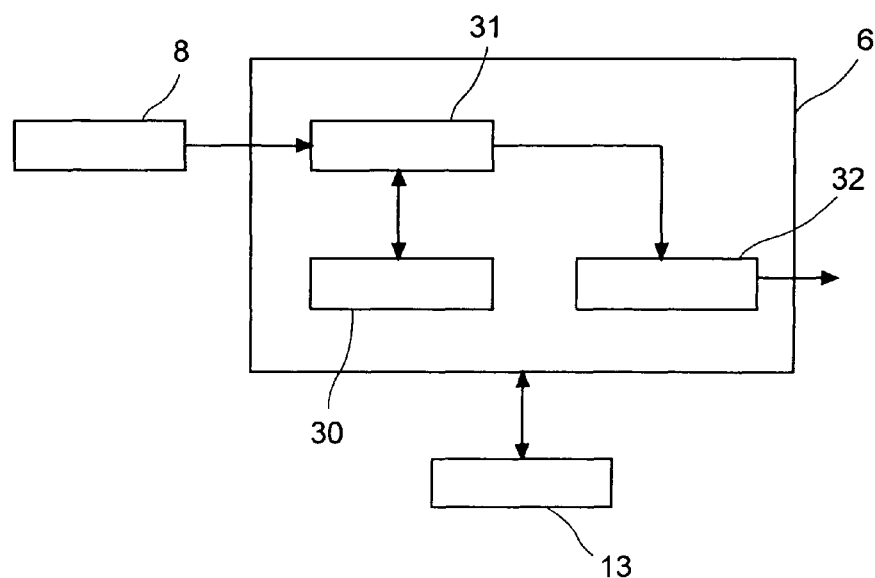
FIG. 5 is a block diagram to show a structure of a liquid crystal element control unit according to the present embodiment.

Next, details of drive control performed by the liquid crystal element control unit 6 for the liquid crystal element 20 will be described. The liquid crystal element control unit 6 is designed so as to decide drive voltages to be applied to the liquid crystal element 20 at a predetermined timing when the optical recording medium 15 is loaded to the optical disc apparatus 1 so that spherical aberration can be corrected appropriately for writing or reading various optical recording media 15 that is loaded to the apparatus. FIG. 5 is a block diagram to show a structure of the liquid crystal element control unit 6. As shown in FIG. 5, the liquid crystal element control unit 6 is equipped with a memory portion 30, a drive voltage deciding portion 31, and a liquid crystal element driving circuit 32.

The memory portion 30 stores information about variation with time of orientation direction of the liquid crystal 24 when a voltage is applied to the liquid crystal 24 (see FIG. 3). More specifically, a constant voltage is applied to the liquid crystal 24 while variation with time of a phase of a light beam that passes through the liquid crystal 24 is measured so as to obtain rates of phase change of the light beam that passes through the liquid crystal 24 at certain time points, which are stored as a table in the memory portion 30. At this point, the term "rate of phase change" means a rate of phase change at each time point with respect to one (1.00) as a whole phase variation of the light beam that passes through the liquid crystal 24 when the orientation state of liquid crystal 24 changes completely from the state before the voltage is applied to the liquid crystal 24 to the orientation state corresponding to the applied constant voltage (hereinafter the term "rate of phase change" is used in the same meaning).

The rate of phase change of the light beam that passes through the liquid crystal 24 at each time point varies also depending on a value of the voltage that is applied to the liquid crystal 24. Since the liquid crystal element 20 is driven by the voltages that are applied to the plurality of regions 28a-28f independently as described above, the memory portion 30 stores the rate of phase change of the light beam that passes through the liquid crystal 24 at each time point for the cases of the plurality of voltage values so that the drive voltages to be applied to the liquid crystal element 20 can be decided by the drive voltage deciding portion 31 that will be described later.

Although the rates of phase change are stored as a table in the memory portion 30 in the present embodiment, the present invention is not limited to this structure. For example, if a constant relational expression of the rate of phase change of the light beam that passes through the liquid crystal 24 at each time point is obtained, the relational expression may be stored in the memory portion 30. In addition, it is sufficient that the information to be stored in the memory portion 30 is information about the variation with time of the orientation direction of the liquid crystal 24 in the case where a voltage is applied to the liquid crystal 24, the present invention is not limited to the structure of the present embodiment. For example, it is possible to store information about variation with time of a refractive index of the liquid crystal 24 (e.g., a table of change rates of refractive indexes of the liquid crystal 24 at time points).

The memory portion 30 may have a structure for storing only information that is necessary for the liquid crystal element control unit 6 to control the drive of the liquid crystal element 20 or may have a structure for storing various information such as information that is necessary for an entire control portion 13, for example.

The drive voltage deciding portion 31 play a role of deciding appropriate drive voltages to be applied to the liquid crystal element 20 by an operation that will be described later, so that quality of recording and reproducing by the optical disc apparatus 1 becomes good. The drive voltage deciding portion 31 is connected electrically to the signal processing unit 8 and is designed so that information necessary for deciding the drive voltages can be obtained by performing a predetermined measurement (that will be described later) about the electric signal that was obtained by the signal processing unit 8.

In addition, the drive voltage deciding portion 31 is connected electrically also to the liquid crystal element driving circuit 32 so as to apply predetermined drive voltages to the liquid crystal element 20 for obtaining information that is necessary for deciding drive voltages and to send the drive voltage information that was finally decided to the liquid crystal element driving circuit 32. Further, as described above, the drive voltage deciding portion 31 is connected also to the memory portion 30 so as to decide the drive voltages to be applied to the liquid crystal element 20 by using the information obtained from the memory portion 30.

As described above, the liquid crystal element driving circuit 32 is connected electrically to the transparent electrodes 25a and 25b (see FIG. 3) that constitute the liquid crystal element 20 so as to drive the liquid crystal element 20. This liquid crystal element driving circuit 32 is connected electrically to the drive voltage deciding portion 31 as described above so as to apply drive voltages to the liquid crystal element 20 based on an instruction sent from the drive voltage deciding portion 31.

Figure 6:
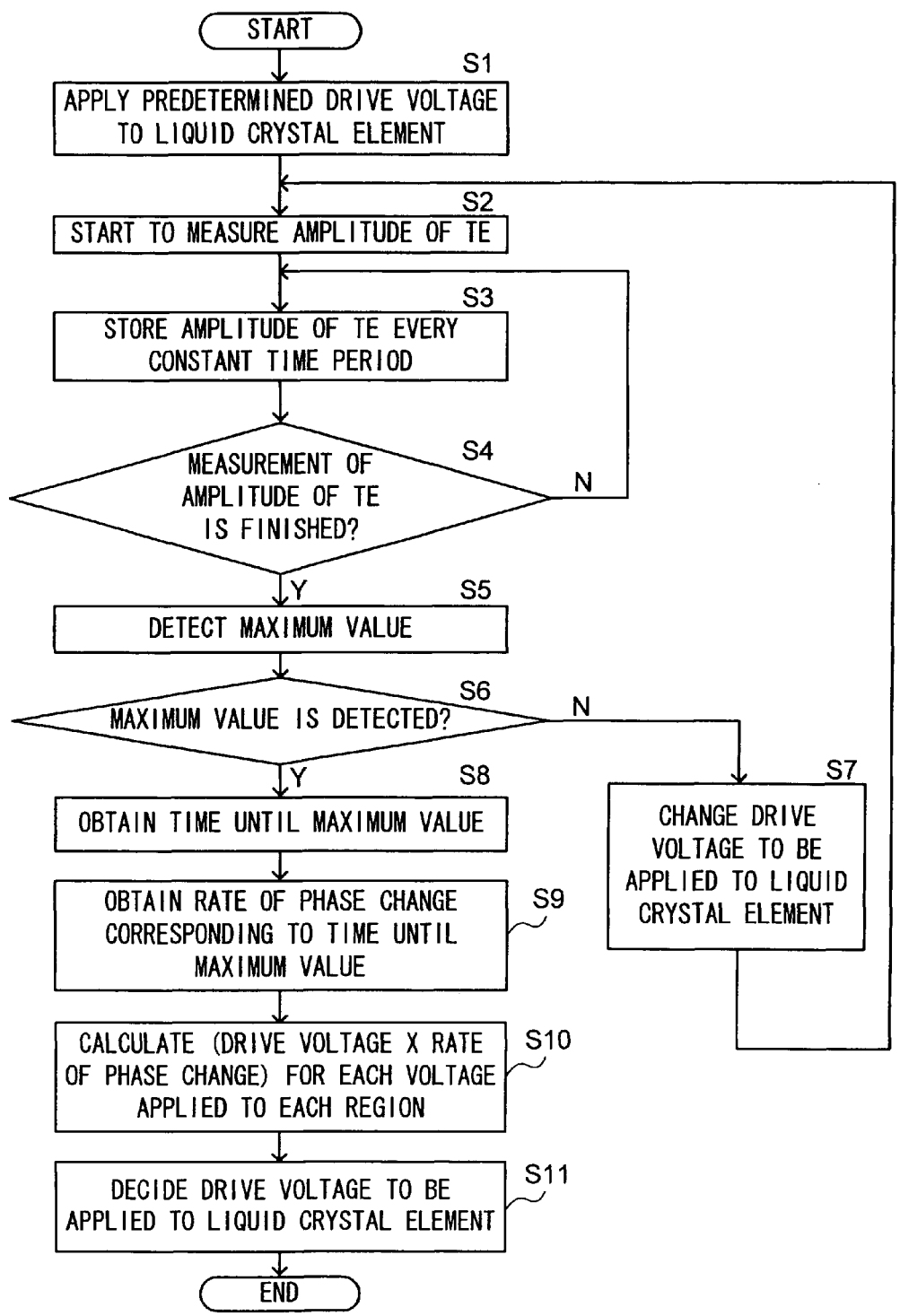
FIG. 6 is a flowchart to show an operation of a drive voltage deciding portion that is provided to the optical disc apparatus according to the present embodiment.

As to the liquid crystal element control unit 6 having the structure described above, details of the operation performed by the drive voltage deciding portion 31 for deciding drive voltages to be applied to the liquid crystal element 20 will be described with reference to a flowchart shown in FIG. 6.

When the optical recording medium 15 is loaded to the optical disc apparatus 1, detection of drive voltages to be applied to the liquid crystal element 20 for correcting spherical aberration appropriately is started at a predetermined timing. At this point, this timing of starting the detection of drive voltages is not limited to a particular timing, but it is preferable to perform the detection before recording or reproducing performed by the optical disc apparatus 1. For example, it is preferable to start the detection promptly when the optical recording medium 15 is loaded to the optical disc apparatus 1.

The detection of drive voltages to be applied to the liquid crystal element 20 is started when the drive voltage deciding portion 31 instructs the liquid crystal element driving circuit 32 to apply a predetermined drive voltage to the liquid crystal element 20 (Step S1). More specifically, since the transparent electrode 25a of the liquid crystal element 20 is divided into a plurality of regions 28a-28f (see FIG. 3), predetermined voltages are applied to the regions, respectively.

Values of the predetermined drive voltages to be applied to the liquid crystal element 20 are not limited to this embodiment at this stage. However, since there is a region where the liquid crystal element 20 does not work normally if the drive voltage that is applied to the liquid crystal element 20 is too high or too low, the voltage values in the region where the liquid crystal element 20 does not work normally should not be selected. Concerning the purpose of shortening time for detecting drive voltages as much as possible, it is preferable to apply a drive voltage that is a little higher than the drive voltage that is estimated to be optimal at this stage. This will be described later.

When the predetermined drive voltages are applied to the liquid crystal element 20, the drive voltage deciding portion 31 starts to measure amplitude of the track error (TE) signal at the same time (Step S2). More specifically, the amplitude of the TE signal means amplitude of the TE signal that is obtained when the spot of light condensed on the recording surface 15a crosses a track formed on the optical recording medium 15 in the state where the light beam emitted from the light source 16 is focused on the recording surface 15a of the optical recording medium 15.

After the measurement of amplitude of the TE signal is started, the amplitude of the TE signal is stored in the memory portion 14 at an interval of a constant time period (Step S3). Then, it is decided whether or not the measurement of amplitude of the TE signal is finished (Step S4). The measurement of amplitude of the TE signal is to be performed at an interval of a predetermined time period, and the measurement of amplitude is continued until this predetermined time period passes. Therefore, the steps S3 and S4 are repeated until the measurement of amplitude of the TE signal is finished.

When the measurement of amplitude of the TE signal is finished, a maximum value of the amplitude of the TE signal is detected from the obtained amplitude information of the TE signal (Step S5). Here, it is checked whether or not the maximum value is detected (Step S6). If the maximum value is not detected, the drive voltages to be applied to the liquid crystal element 20 are changed (Step S7), so that the process from the step S2 to the step S6 is repeated until a maximum value is obtained.

Figure 7:
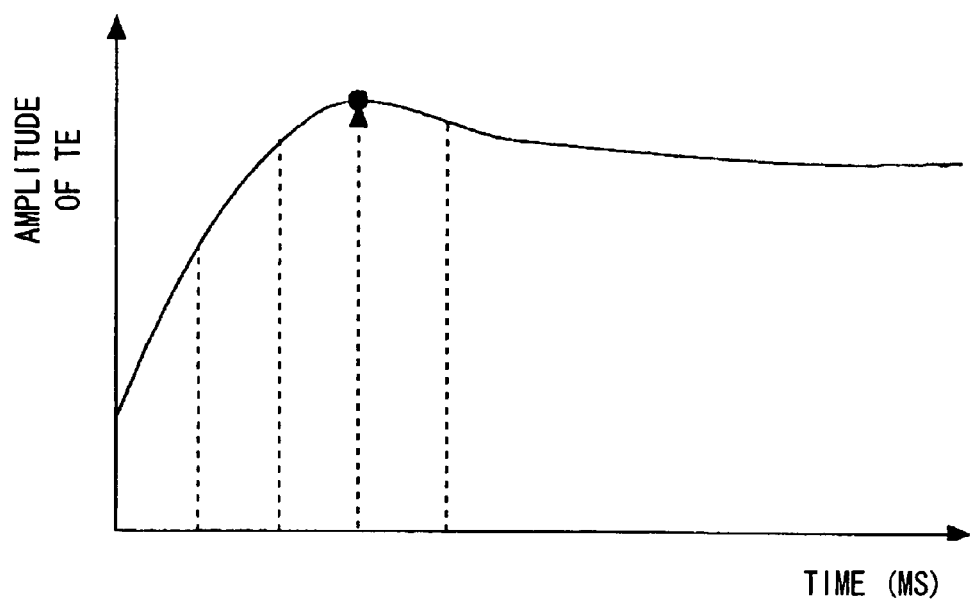
FIG. 7 is a graph to show a variation with time of amplitude of a TE signal in the case where a predetermined drive voltage is applied to the liquid crystal element.

Before describing about the step S8 and the subsequent steps, a principle of the operation from the steps S1 to S7 will be described with reference to FIG. 7. FIG. 7 is a graph to show a variation with time of the amplitude of the TE signal in the case where predetermined drive voltages are applied to the liquid crystal element 20.

When drive voltages are applied to the liquid crystal element 20, the liquid crystal 24 of the liquid crystal element 20 starts to be orientated in a constant direction in accordance with the drive voltages. While the orientation direction of the liquid crystal 24 is changing, a phase of the light beam that is emitted from the light source 16 passes through the liquid crystal element 20 changes every moment. Therefore, the amplitude of the TE signal that is obtained by processing the electric signal from the photo detector 23 changes every moment.

Amplitude of the TE signal becomes a maximum value when the reproduced signal becomes optimal. Therefore, a time point when the amplitude of the TE signal becomes a maximum value (shown by a dot in the graph of FIG. 7) is detected, and the drive voltages are applied to the liquid crystal element 20 so that the orientation state of the liquid crystal 24 at the time point is reproduced. Then, a reproduced signal having a best quality can be obtained. To decide the drive voltages that enables the liquid crystal element 20 to obtain the optimal reproduced signal is the final purpose of the drive voltage deciding portion 31, and the process from the step S1 to the step S7 described above is the stage to find the orientation state of the liquid crystal 24 for obtaining the optimal reproduced signal.

The purpose of storing the amplitude of the TE signal at an interval of a constant time period (5 milliseconds in FIG. 7) in the step S3 is to detect a point where the amplitude of the TE signal becomes the maximum, and it is preferable to measure the amplitude of the TE signal as at an interval of a time period as short as possible so that a maximum value of amplitude the TE signal can be detected securely. In addition, it should be noted that if time necessary for measuring the amplitude of the TE signal become long, the interval of the measurement will be lengthened so that there may be the case where a maximum value can not be detected. In this case, it is necessary to perform a measurement that is different from the measurement of amplitude of the TE signal, which will be described later.

Figure 8:
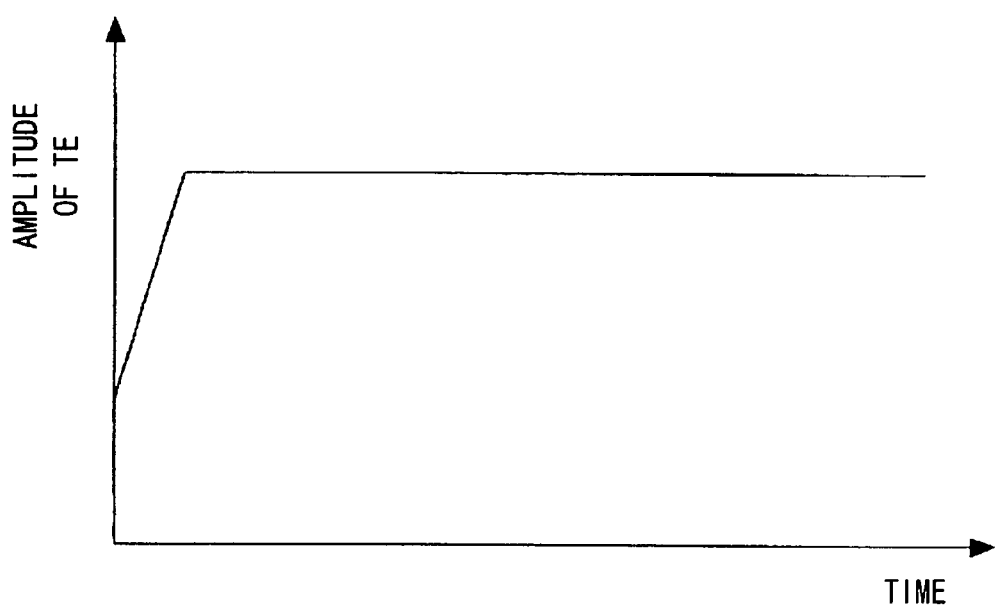
FIG. 8 is a graph to show a variation with time of amplitude of the TE signal in the case where a predetermined drive voltage is applied to the liquid crystal element, for comparing with FIG. 7.

There is a case where a maximum value cannot be detected depending on a value of the predetermined drive voltages applied in the step S1. Therefore, the step S7 is provided. This structure corresponds to the case where a value of the predetermined drive voltage in the step S1 is smaller than the drive voltage necessary for the orientation state of the liquid crystal 24 to be optimal, and this state is indicated in FIG. 8. In this state, the drive voltage necessary for the orientation state of the liquid crystal 24 to be optimal cannot be decided, so it is preferable that the predetermined drive voltage that is applied the step S1 be a little higher than the drive voltage necessary for the orientation state of the liquid crystal 24 to be optimal. At this point, this value can be estimated by an experiment in advance to a certain extent, so that frequency of performing the operation in the step S7 can be decreased. In other words, alteration setting of the drive voltage can be avoided in a usual case, so that time for detecting the drive voltages can be shortened.

In addition, although the case described above has the structure in which amplitude of the TE signal is measured for detecting the case where the reproduced signal becomes optimal, the present invention is not limited to this structure. Any measurement can be adopted as long as the case where the reproduced signal becomes optimal can be detected by the measurement. This measurement can be a measurement of amplitude of the RF signal or a measurement of jitter value, for example. If the amplitude of the RF signal is measured, the maximum value should be detected similarly to the case of the amplitude of the TE signal, as the case where the reproduced signal becomes optimal. If the jitter value is measured, a minimum value should be detected.

With reference to FIG. 6 again, an operation of the step S8 and the subsequent steps will be described. If the maximum value of amplitude of the TE signal is detected, the time after application of the predetermined drive voltage until the amplitude of the TE signal becomes maximum is obtained (Step S8). Next, the rate of phase change in the light beam that passes through the liquid crystal 24 in the time when the amplitude of the TE signal becomes maximum is obtained from a table stored in the memory portion 30 (Step S9). The orientation state of the liquid crystal 24 corresponding to the rate of phase change obtained here is the orientation state of the liquid crystal 24 that enables the reproduced signal to be optimal. The drive voltage of the liquid crystal element 20 to be this orientation state can be determined as follows.

Here, since the transparent electrode 25a of the liquid crystal element 20 is divided into a plurality of regions 28a-28f (see FIG. 3) to which voltages are applied independently, the rate of phase change of the light beam that passes through the liquid crystal 24 at the time when the amplitude of the TE signal becomes maximum is obtained with respect to each of the regions 28a-28f.

Figure 9:
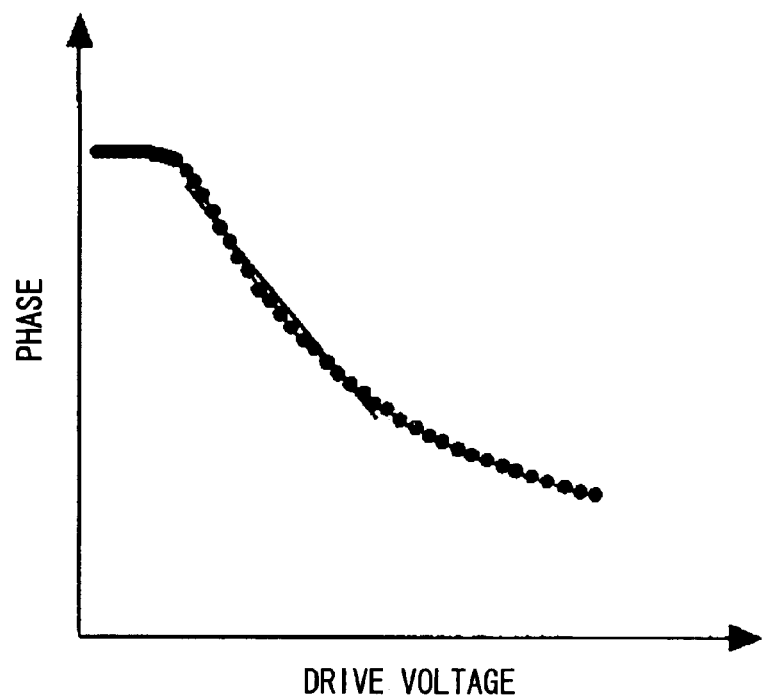
FIG. 9 is a graph to show a relationship between a voltage that is applied to the liquid crystal and a phase of a light beam that passes through the liquid crystal.

FIG. 9 is a graph to show a relationship between a voltage that is applied to the liquid crystal 24 for correcting spherical aberration and a phase of the light beam that passes through the liquid crystal 24. As shown in FIG. 9, it can be said that the drive voltage and the phase of the light beam that passes through the liquid crystal 24 have a negative correlation, and further a negative linear correlation if the voltage to be applied to the liquid crystal 24 is within the range related to the present invention. Therefore, if it is sufficient that a change of α % of the phase change obtained when a certain voltage is applied to the liquid crystal 24 (corresponding to the rate of phase change) is obtained, a desired phase change can be obtained substantially by applying a voltage obtained by multiplying α % to the voltage as a first order approximation. Thus, by applying this drive voltage to the liquid crystal element 20, the liquid crystal element 20 can correct spherical aberration appropriately. If it is desired to increase accuracy, the order of the approximation should be enhanced to the second order or the third order by using the graph shown in FIG. 9.

Therefore, the first approximation of the drive voltages to be applied to the liquid crystal element 20 are voltages obtained by multiplying respectively the rates of phase change obtained in the step S9 to the voltages that were applied to the regions 28a-28f as predetermined drive voltages of the liquid crystal element 20 in the step S1. The drive voltage deciding portion 31 calculates and decides these drive voltages after the step S8 (Steps S10 and S11).

Figure 10:
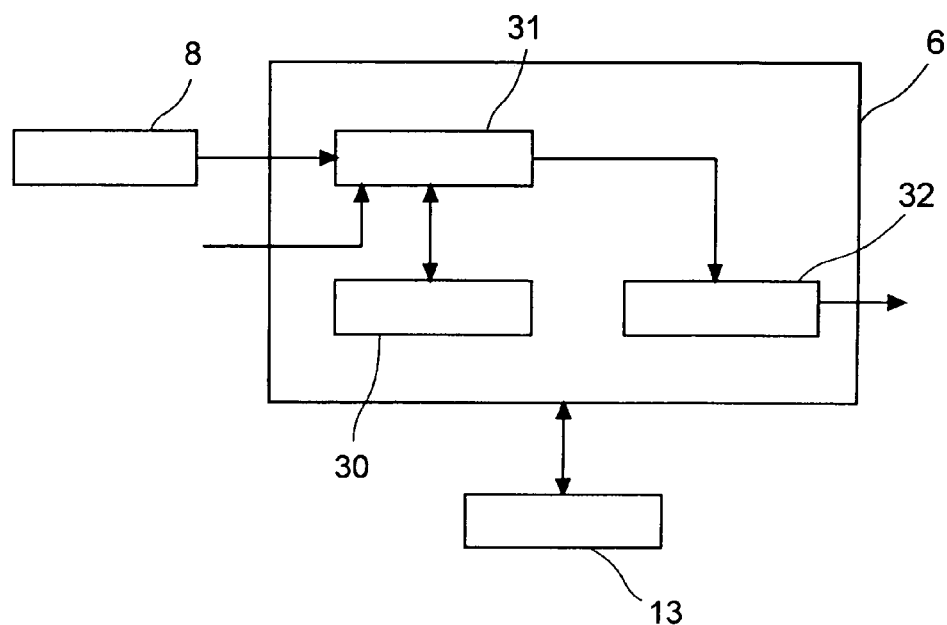
FIG. 10 shows a variation of the optical disc apparatus according to the present invention.

Although a variation of performance of the liquid crystal element 20 in accordance with ambient temperature is not considered in the present embodiment described above, it is possible to adopt a structure in which the variation is considered. More specifically, it is possible to dispose a temperature sensing unit 33 (e.g., a thermistor or the like) that can sense ambient temperature of the liquid crystal element 20 in the optical disc apparatus 1, so that the sensed temperature can be sent to the drive voltage deciding portion 31 as shown in FIG. 10, for example. At this point, FIG. 10 is a block diagram to show a variation of the liquid crystal element control unit 6.

In this structure, the memory portion 30 determines the rate of phase change of the light beam that passes through the liquid crystal 24 at each time point at each predetermined temperature for example, and it stores the determined rates as a table. Then, the drive voltage deciding portion 31 selects information to be read out from the memory portion 30 based on the temperature information from the temperature sensing unit, and it determines the drive voltage of the liquid crystal element 20 based on the information read out based on the temperature. According to this structure, it is possible to support the change of performance of the liquid crystal element 20 due to the temperature variation so that the liquid crystal element 20 can correct aberration more appropriately.

In addition, although the optical disc apparatus 1 of the present embodiment described above has one light source and supports only one type of optical recording medium 15, the present invention is not limited to this structure. The present invention can be applied also to the case where the optical disc apparatus 1 supports a plurality of types of optical recording media.

Further, although the liquid crystal element 20 of the optical disc apparatus according to the present embodiment 1 is a type that corrects spherical aberration, the present invention can be applied also to the optical disc apparatus equipped with the liquid crystal element that corrects aberration other than spherical aberration (e.g., comatic aberration or astigmatic aberration). Other than that, although the optical disc apparatus 1 of the present embodiment is capable of recording and reproducing, the present invention is not limited to this structure. It is of course possible to apply the present invention to an optical disc apparatus that is capable only reproducing.

The present invention is useful in particular for the optical disc apparatus that needs correction of wave aberration and is equipped with a liquid crystal element for correcting wave aberration, because a drive condition for the liquid crystal element to perform correction of wave aberration appropriately can be detected easily and at high speed.

What is claimed is:

1. An optical disc apparatus comprising:
   a light source;
   an optical system including an objective lens, which condenses a light beam emitted from the light source onto a recording surface of the optical recording medium and leads a light beam reflected by the recording surface to a predetermined light receiving position;
   a liquid crystal element including liquid crystal and two transparent electrodes that sandwich the liquid crystal, the liquid crystal element disposed in the optical system so as to correct wave aberration; and
   light detecting unit disposed at the predetermined light receiving position so as to receive the light beam reflected by the recording surface, wherein the optical disc apparatus further comprises:
   a memory portion for storing information about a variation with time of orientation direction of the liquid crystal in the case where a voltage is applied to the liquid crystal, with respect to at least one type of voltage value, and
   a drive voltage deciding portion that obtains time period after a predetermined drive voltage is applied to the liquid crystal element until a reproduced signal obtained by processing an electric signal converted by the light detecting unit becomes optimal, and decides a drive voltage to be applied to the liquid crystal element based on the obtained time period, the information stored in the memory portion, and the predetermined drive voltage.

2. The optical disc apparatus according to claim 1, wherein the information about the variation with time of orientation direction of the liquid crystal is information about a variation with time of a phase of a light beam that passes through the liquid crystal.

3. The optical disc apparatus according to claim 1, wherein the time period until the reproduced signal becomes optimal is obtained by measuring any one of amplitude of the RF signal, amplitude of a tracking error signal and a jitter value, simultaneously with application of the predetermined drive voltage at an interval of a constant time period.

4. The optical disc apparatus according to claim 2, wherein the time period until the reproduced signal becomes optimal is obtained by measuring any one of amplitude of the RF signal, amplitude of a tracking error signal and a jitter value, simultaneously with application of the predetermined drive voltage at an interval of a constant time period.

5. The optical disc apparatus according to claim 1, wherein
   at least one of the transparent electrodes is divided into a plurality of regions, so that the liquid crystal element is driven by applying individual voltages to the plurality of regions,
   the predetermined drive voltage is a predetermined voltage to be applied to each of the plurality of regions, and
   the drive voltage that is decided by the drive voltage deciding portion is a voltage to be applied to each of the plurality of regions.

6. The optical disc apparatus according to claim 2, wherein
   at least one of the transparent electrodes is divided into a plurality of regions, so that the liquid crystal element is driven by applying individual voltages to the plurality of regions,
   the predetermined drive voltage is a predetermined voltage to be applied to each of the plurality of regions, and
   the drive voltage that is decided by the drive voltage deciding portion is a voltage to be applied to each of the plurality of regions.

7. The optical disc apparatus according to claim 3, wherein
   at least one of the transparent electrodes is divided into a plurality of regions, so that the liquid crystal element is driven by applying individual voltages to the plurality of regions,
   the predetermined drive voltage is a predetermined voltage to be applied to each of the plurality of regions, and
   the drive voltage that is decided by the drive voltage deciding portion is a voltage to be applied to each of the plurality of regions.

8. The optical disc apparatus according to claim 1, wherein
   a temperature sensing unit for measuring ambient temperature of the liquid crystal element is disposed in the apparatus,
   the memory portion stores the information about the variation with time of orientation direction of the liquid crystal for each predetermined temperature with respect to at least one type of voltage value, and the drive voltage deciding portion decides the drive voltage to be applied to the liquid crystal element based on the temperature obtained by the temperature sensing unit.

9. The optical disc apparatus according to claim 2, wherein a temperature sensing unit for measuring ambient temperature of the liquid crystal element is disposed in the apparatus, the memory portion stores the information about the variation with time of orientation direction of the liquid crystal for each predetermined temperature with respect to at least one type of voltage value, and the drive voltage deciding portion decides the drive voltage to be applied to the liquid crystal element based on the temperature obtained by the temperature sensing unit.

10. The optical disc apparatus according to claim 3, wherein a temperature sensing unit for measuring ambient temperature of the liquid crystal element is disposed in the apparatus, the memory portion stores the information about the variation with time of orientation direction of the liquid crystal for each predetermined temperature with respect to at least one type of voltage value, and the drive voltage deciding portion decides the drive voltage to be applied to the liquid crystal element based on the temperature obtained by the temperature sensing unit.

11. The optical disc apparatus according to claim 4, wherein a temperature sensing unit for measuring ambient temperature of the liquid crystal element is disposed in the apparatus, the memory portion stores the information about the variation with time of orientation direction of the liquid crystal for each predetermined temperature with respect to at least one type of voltage value, and the drive voltage deciding portion decides the drive voltage to be applied to the liquid crystal element based on the temperature obtained by the temperature sensing unit.

* * * * *